(12) United States Patent
Gong

(10) Patent No.: US 10,226,987 B2
(45) Date of Patent: Mar. 12, 2019

(54) FOLDING SUNSHADE

(71) Applicant: CREATIVE & COOPERATIVE INTERNATIONAL, INC., Taipei (TW)

(72) Inventor: Jing-Shyong Gong, Taipei (TW)

(73) Assignee: Shyu Fuu Industrial Co., Ltd., Tainan (TW)

( * ) Notice: Subject to any disclaimer, the term of this patent is extended or adjusted under 35 U.S.C. 154(b) by 152 days.

(21) Appl. No.: 14/922,471

(22) Filed: Oct. 26, 2015

(65) Prior Publication Data

US 2017/0113519 A1  Apr. 27, 2017

(51) Int. Cl.
B60J 1/20 (2006.01)
(52) U.S. Cl.
CPC ........... B60J 1/2091 (2013.01); B60J 1/2011 (2013.01)
(58) Field of Classification Search
CPC . B60J 1/2091; B60J 1/02; B60J 1/2088; B60J 1/2077; B60J 1/2011; B42B 2/00
USPC .................................... 160/135, 351; 16/225
See application file for complete search history.

(56) References Cited

U.S. PATENT DOCUMENTS

| | | | | |
|---|---|---|---|---|
| 565,381 A * | 8/1896 | Ellsworth | ................. | B42B 2/02 281/27 |
| 1,276,174 A * | 8/1918 | Carter | ....................... | E05D 1/02 16/225 |
| 2,850,087 A * | 9/1958 | Janaman | ................. | B60J 1/2011 160/105 |
| 5,553,908 A * | 9/1996 | Shink | ....................... | B60J 11/08 160/370.21 |
| 5,878,645 A * | 3/1999 | Streit | ....................... | D03D 1/00 112/441 |
| 6,220,265 B1 * | 4/2001 | Zheng | ....................... | A63B 9/00 135/125 |
| 2003/0066553 A1 * | 4/2003 | Zheng | ....................... | A63B 9/00 135/126 |
| 2005/0247415 A1 * | 11/2005 | Conforti | ................ | B60J 1/2091 160/370.21 |
| 2016/0024839 A1 * | 1/2016 | Ferguson | .................. | E06B 9/24 160/351 |
| 2016/0122927 A1 * | 5/2016 | Brown | ................... | D05B 93/00 112/475.08 |

* cited by examiner

Primary Examiner — Katherine W Mitchell
Assistant Examiner — Jeremy C Ramsey
(74) Attorney, Agent, or Firm — Muncy, Geissler, Olds & Lowe, P.C.

(57) ABSTRACT

A folding sunshade comprises two sunshade panels and a binding member. Each sunshade panel includes an annular frame, a shade screen surrounded by the annular frame, a connection element connecting the annular frame and the shade screen in a spaced manner and a gap interposed between the annular frame and the shade screen. The two annular frames include respectively one side abutting each other to be defined as a connection frame side and other portions outside the connection frame side defined as an operation frame side. The binding member includes an extended state in which each curved section is tightly stretched to confine each operation frame side to be separated from each other in a maximum manner, and a folding state in which each confining section is tightly stretched to allow one operation frame side to swivel and fold over another operation frame side.

7 Claims, 8 Drawing Sheets

FOLDING SUNSHADE

FIELD OF THE INVENTION

The present invention relates to a folding sunshade and particularly to a folding sunshade with a plurality of sunshade panels that are foldable for storing.

BACKGROUND OF THE INVENTION

When vehicles are parked outdoors for a prolonged period and exposed to strong sunshine the temperature inside the vehicles increases that makes drivers entering the vehicles feel sweltering and uncomfortable. In addition, the interior seating and draperies of the vehicles also are prone to degrading, peeling or discoloring when exposed to the sunshine. To remedy such problems various types of sunshades have been developed to reduce damages caused by the strong sunshine.

A conventional vehicle sunshade includes a plurality of indented folding traces formed by compression to facilitate folding and save storing space. However, due to the folding traces are uneven, gaps are easily formed between the sunshade and vehicle window frames that result in passing through of light, or not secure coupling between them that could cause loosening off of the sunshade. To overcome those problems another type of sunshade has been developed that comprises a flexible metal frame which can be bent to fold the entire sunshade into a lump to make storing easier, and also can be extended to mate the contour of the vehicle window frames to fully block sunshine. However, the windshield of the vehicles usually is formed at a larger size, making the flexible metal frame with desired evenness requires complex fabrication processes that make manufacturing cost higher. Moreover, fabricating the flexible metal frame for a larger area also requires greater strength and needs bigger and thicker metal frame materials, and also requires users to take greater strength and effort to bend for storing. As a result, use inconvenience increases. All this shows that there is still room for improvement.

SUMMARY OF THE INVENTION

The primary object of the present invention is to solve the problems of the conventional one-piece flexible sunshade of higher fabrication cost and not easy bending for storing.

To achieve the foregoing object the present invention provides a folding sunshade that comprises two sunshade panels and a binding member. Each sunshade panel includes an annular frame, a shade screen surrounded by the annular frame, a connection element connecting the annular frame and the shade screen in a spaced manner and a gap interposed between the annular frame and the shade screen. The two annular frames include respectively one side abutting each other to be defined as a connection frame side and other portions outside the connection frame side defined as an operation frame side. The binding member binds and connects each connection frame side through the gap, and includes a plurality of curved sections located at one side of each connection frame side and a plurality of confining sections located at another side from each connection frame side and connected to each curved section. The binding member also includes an extended state in which each curved section is tightly stretched to confine each operation frame side to be separated from each other in a maximum manner, and a folding state in which each confining section is tightly stretched to allow one operation frame side to swivel and fold over another operation frame side.

In one aspect the length of the confining sections binding the connection frame side is longer than the length of the curved sections binding the connection frame side.

In another aspect the curved sections are plain stitching threads straddled each connection frame side and the confining sections are twilled stitching threads straddled each connection frame side in a staggered manner.

In yet another aspect the binding member includes a tail binding section at two sides of the curved sections and the confining sections to bind each connection frame side.

In yet another aspect the annular frame is flexible and the connection element is a layer covered by cloth.

In yet another aspect the annular frame is flexible and the connection element is a mesh structure.

In yet another aspect each sunshade panel includes at least one magnetic attraction member located on the annular frame.

In yet another aspect each sunshade panel includes at least one suction cup located on the shade screen.

The invention thus formed, compared with the conventional techniques, can provide many advantages, notably:

The folding sunshade of the invention can be fabricated in two smaller sunshade panels that are coupled through a turning and folding structure. Through the turning and folding structure the sunshade panels can be overlapped and bent under forces to facilitate storing. Hence it can be made at a lower cost than the conventional techniques of directly making the sunshade at a greater size. Usability improves. It also can be snugly fitted to vehicle window frames to enhance light blocking efficacy.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
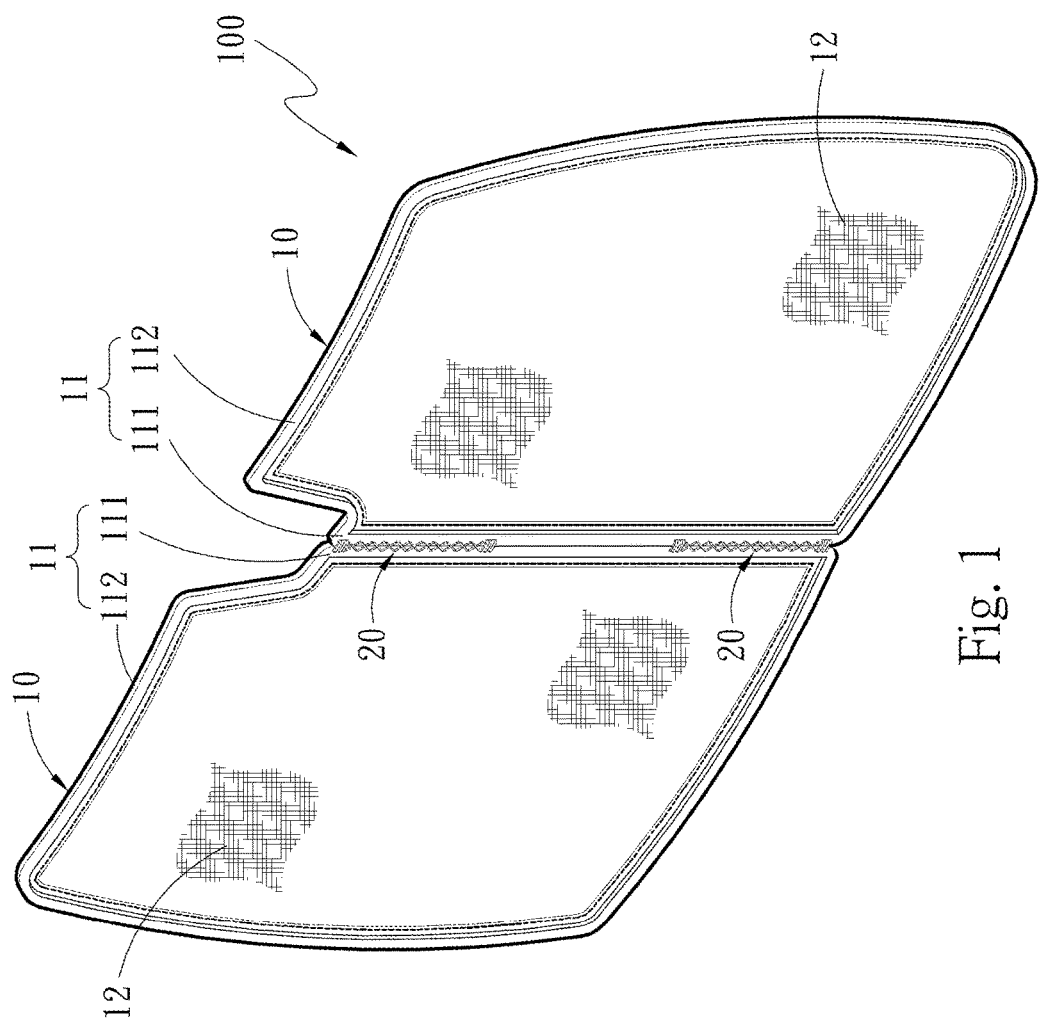
FIG. 1 is a perspective view of a first embodiment of the invention.

Please referring to FIG. 1, the present invention aims to provide a folding sunshade 100 that mainly comprises at least two sunshade panels 10 and a binding member 20. The folding sunshade 100 is deployed inside a vehicle to block sunshine from outside. The binding member 20 is connected to each sunshade panel 10 in a bendable manner to facilitate storing of the folding sunshade 100. In practice the invention also can be used on other carriers such as buses, yachts or airplanes, or even windows of buildings, without limited to vehicle windows. The folding sunshade 100 also can include more than two sets of the sunshade panels 10.

Figure 2:
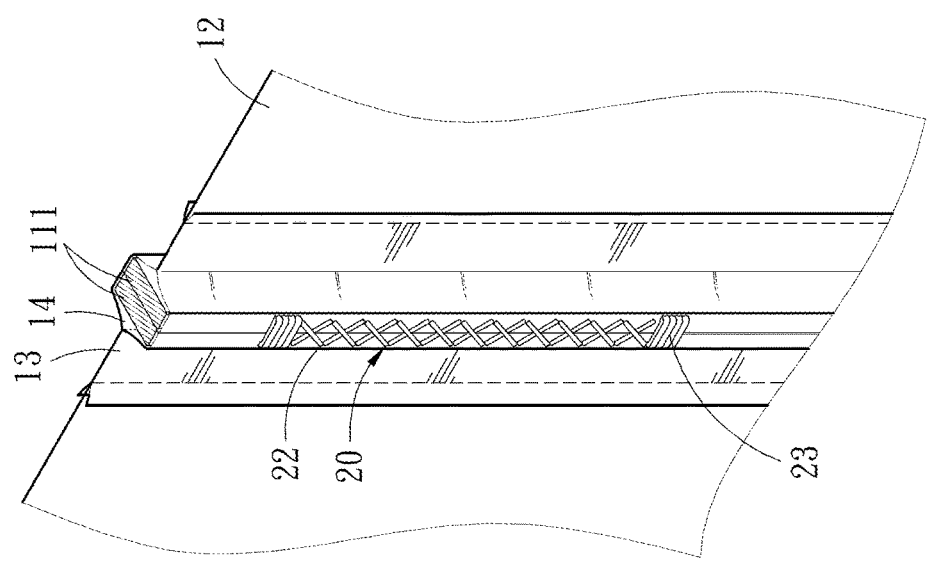
FIG. 2 is a fragmentary sectional view of FIG. 1.
Figure 3:
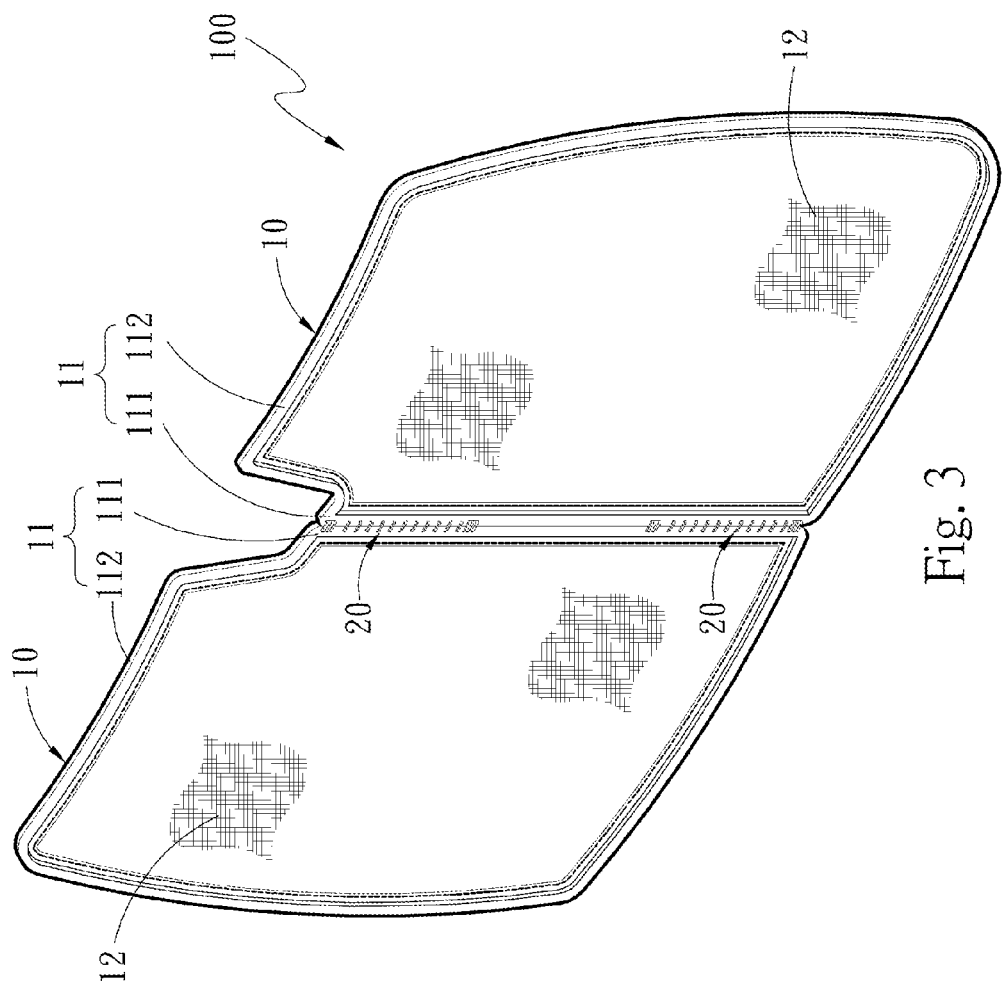
FIG. 3 is a perspective view of the first embodiment of the invention seen from another side.
Figure 4:
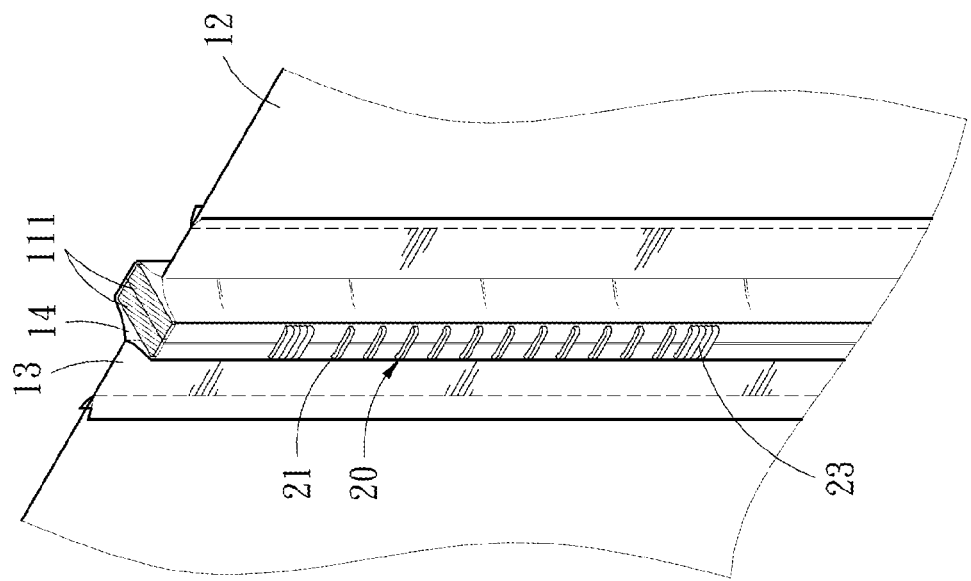
FIG. 4 is a fragmentary sectional view of FIG. 3.

More specifically, please referring to FIGS. 1 and 2, each sunshade panel 10 includes an annular frame 11, a shade screen 12 surrounded by the annular frame 11, a connection element 13 connecting the annular frame 11 and the shade screen 12 in a spaced manner and a gap 14 interposed between the annular frame 11 and the shade screen 12. The two annular frames 11 include respectively one side abutting each other to be defined as a connection frame side 111 and other portions outside the connection frame side 111 defined as an operation frame side 112. The "connection frame side 111" means one side of each annular frame 11 that is connected with each other, while the "operation frame side" 112 means another side to facilitate grasping and force applying of users to make retraction for storing or folding. In this embodiment the annular frame 11 is flexible. The shade screen 12 can be made of aluminum foiled blister cloth, mesh, yarn screen or the like. It also can be formed by coating reflective paint or the like on the shade screen 12. The connection element 13 is made from material with a definite stiffness such as a layer covered by cloth or a mesh structure that can be deformed under forces so that when the annular frame 11 is extended the connection element 13 can be propped up and the shade screen 12 also can be stretched to form a sheet with the gap 14 formed between the annular frame 11 and the shade screen 12.

Figure 5:
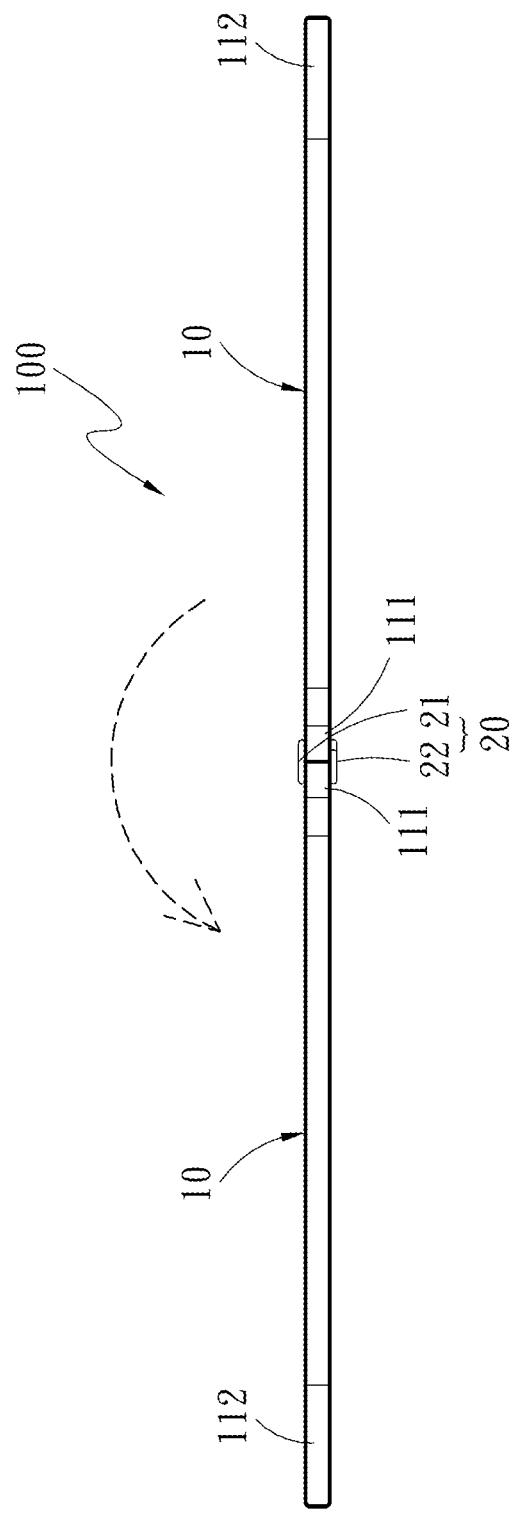
FIG. 5 is a side view of a vehicle sunshade panel of the invention in an extended state.
Figure 6:
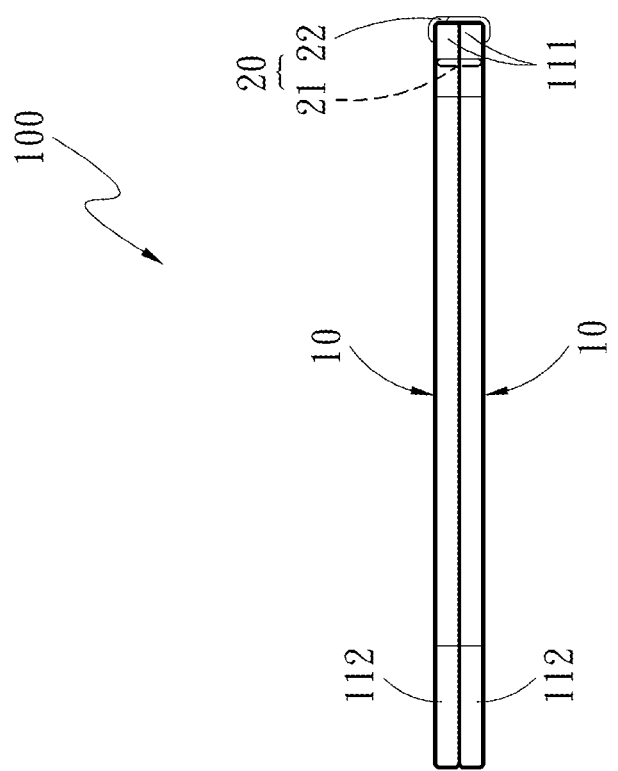
FIG. 6 is a schematic view of a vehicle sunshade panel of the invention in a use condition.
Figure 7:
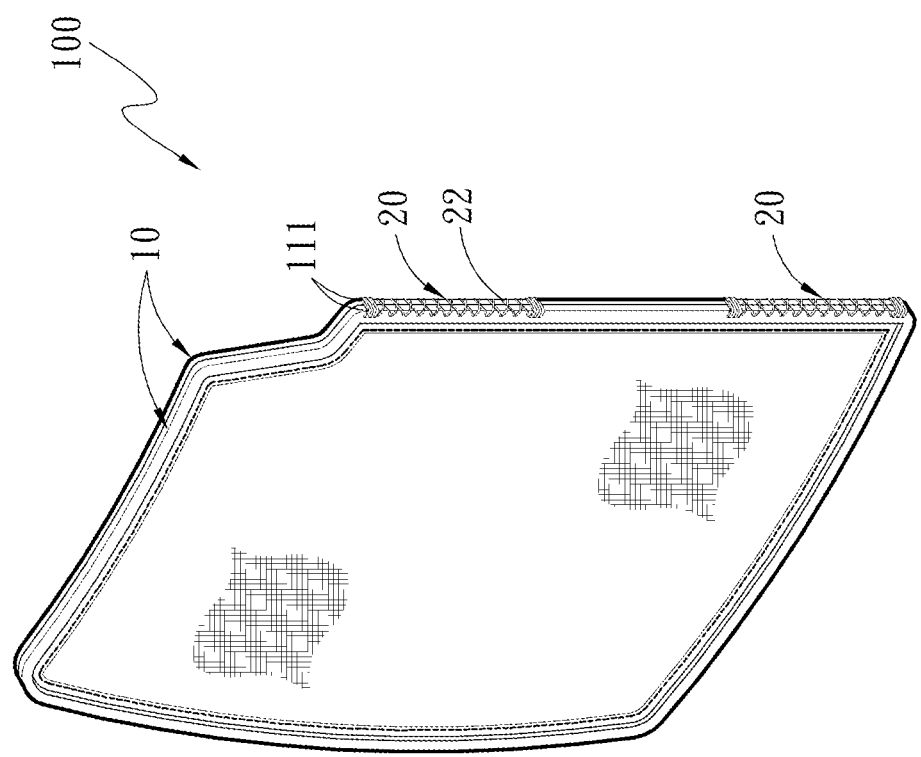
FIG. 7 is a perspective view of a vehicle sunshade panel of the invention in a folding condition.

Please also referring to FIGS. 1 through 4, the binding member 20 binds and connects each connection frame side 111 through the gap 14, and includes a plurality of curved sections 21 located at one side of each connection frame side 111 and a plurality of confining sections 22 located at another side of each connection frame side 111 and connected to the curved sections 21. Also referring to FIG. 5, the binding member 20 also includes an extended state in which each curved section 21 is tightly stretched to confine each operation frame side 112 to be separated from each other in a maximum manner, and a folding state in which each confining section 22 is tightly stretched to allow one operation frame side 112 to swivel and fold over another operation frame side 112 as shown in FIGS. 6 and 7.

In a first embodiment of the invention the curved sections 21 are plain stitching threads straddled each connection frame side 111, and the confining sections 22 are twilled stitching threads straddled each connection frame side 111 in a staggered manner. At the extended state because the confining sections 22 and the curved sections 21 at two sides of the two joined sunshade panels 10 have different thread lengths, the curved sections 21 with a smaller binding range cause the strapped operation frame side 112 unable to swivel away from the curved sections 21 because of thread length limitation. On the other hand, at the folding state, due to the confining sections 22 have a longer thread length the two sunshade panels 10 can be swiveled and overlapped to retract the curved sections 21 into the gap 14 of the connection element 13. In addition, the binding member 20 further includes a tail binding section 23 at two sides of the curved sections 21 and the confining sections 22 to bind each connection frame side. The tail binding section 23 can be a plurality of plain stitching threads formed in a dense and continuous manner formed between the connection frame sides 111 or thread knots to avoid the threads from loosening off. However, the aforesaid structures or techniques are not the limitation of the invention.

Figure 8:
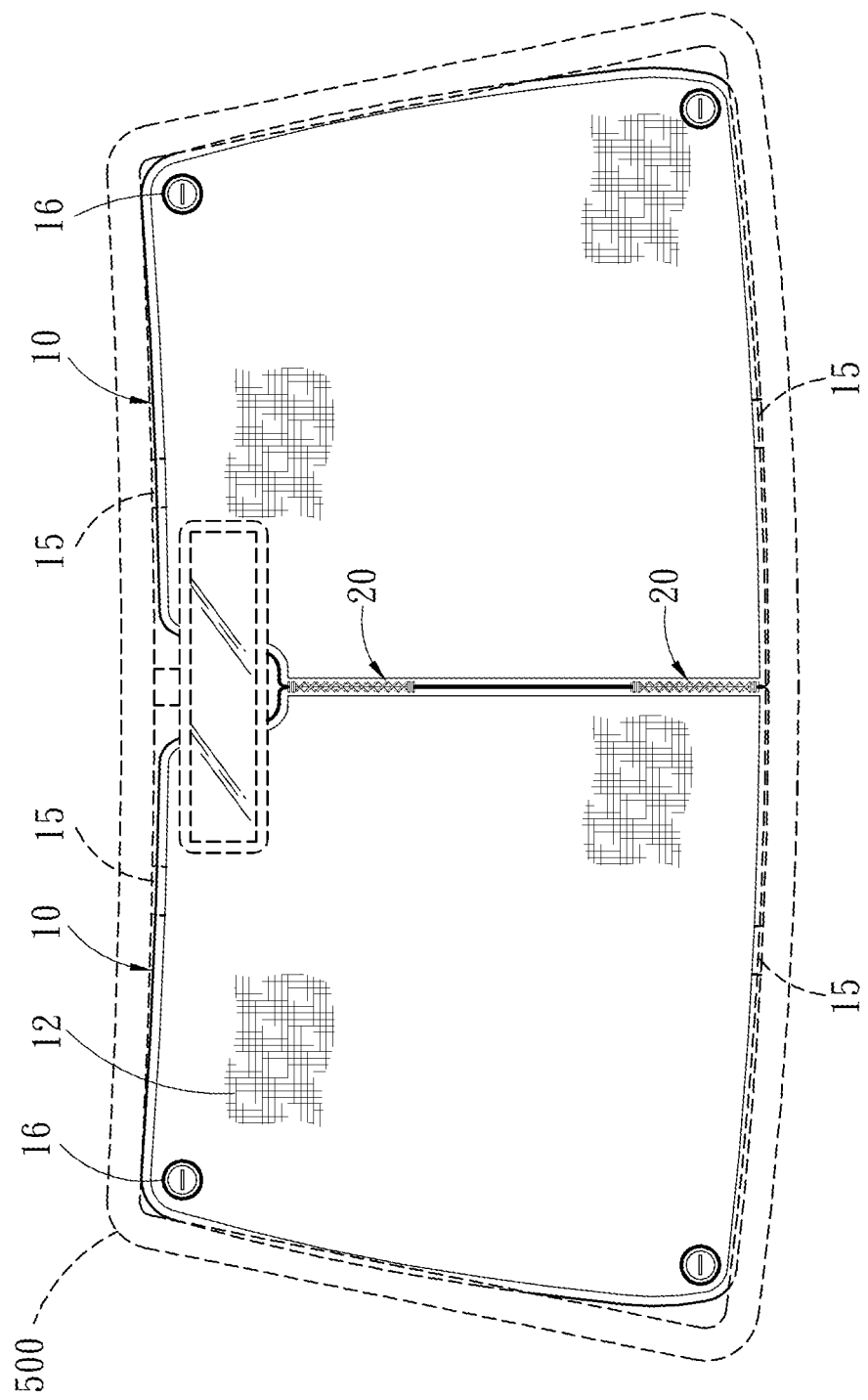
FIG. 8 is a schematic view of a second embodiment of the invention in a use condition.

Please referring to FIG. 8, in another embodiment of the invention each annular frame 11 includes at least one magnetic attraction element 15 located on the annular frame 11, or a suction cup 16 located on the shade screen 12 to attach to a vehicle window frame 500 or a vehicle window or the like, so that each shade screen 12 can securely cover the vehicle window to block sunshine as desired. The magnetic attraction element 15 or the suction cup 16 is merely one of possible embodiments. In practice they can be changed or switched according to actual requirements.

As a conclusion, the folding sunshade of the invention consists of the sunshade panels and the binding member that can be made at a lower cost than the conventional flexible sunshade panel formed at a larger size. It also makes storing easier than the conventional flexible sunshade panel of a larger size that requires greater structural strength.

What is claimed is:

1. A folding sunshade, comprising:
   two sunshade panels each including an annular frame, a shade screen surrounded by the annular frame, a connection element connected to the annular frame and the shade screen in a spaced manner and a gap interposed between the annular frame and the shade screen, the two annular frames including two abutting sides defined respectively as a connection frame side and other portions outside the connection frame side defined respectively as an operation frame side; and
   two binding members which bind the connection frame side through the gap, and each of the two binding members including a plurality of curved sections at the connection frame side and a plurality of confining sections connected to the curved sections and located at another side of the connection frame side, and a tail binding section at two sides of the curved sections and the confining sections to bind the connection frame side, and an extended state in which each curved section is tightly stretched to confine each operation frame side to be separated from each other in a maximum manner, and a folding state in which each confining section is tightly stretched to allow one operation frame side to swivel and fold over another operation frame side.

2. The folding sunshade of claim 1, wherein a length of the confining sections binding the connection frame side is longer than a length of the curved sections binding the connection frame side.

3. The folding sunshade of claim 2, wherein the curved sections are plain stitching threads which straddle the connection frame side of one sunshade panel to the connection from side of other sunshade panel, and the confining sections are twilled stitching threads which straddle the connection frame side of one sunshade panel to the connection frame side of the other sunshade panel in a staggered manner.

4. The folding sunshade of claim 1, wherein the annular frame is flexible and the connection element is a layer covered by cloth.

5. The folding sunshade of claim 1, wherein the annular frame is flexible and the connection element is a mesh structure.

6. The folding sunshade of claim 1, wherein each sunshade panel includes at least one magnetic attraction element located on the annular frame.

7. The folding sunshade of claim 1, wherein each sunshade panel includes at least one suction cup located on the shade screen.

* * * * *